United States Patent [19]

Skiff

[11] Patent Number: 4,921,555
[45] Date of Patent: May 1, 1990

[54] PROCESS FOR REINFORCING UTILITY POLES

[76] Inventor: Russell A. Skiff, 15170 Avenue 260, Visalia, Calif. 93277

[21] Appl. No.: 356,411

[22] Filed: May 25, 1989

[51] Int. Cl.$^5$ .............................................. B32B 35/00
[52] U.S. Cl. .................................... 156/98; 52/169.13; 52/170; 52/514; 156/71; 156/94; 156/215; 156/330; 264/36; 405/216; 428/63
[58] Field of Search ...................... 52/169.13, 170, 514; 156/94, 98, 71, 215, 330; 264/36; 405/216; 428/63

[56] References Cited

U.S. PATENT DOCUMENTS

| | | | |
|---|---|---|---|
| 3,177,667 | 4/1965 | Liddell | 405/216 |
| 3,390,951 | 7/1968 | Finger et al. | 405/216 X |
| 4,244,156 | 1/1981 | Watts | 52/170 X |
| 4,306,821 | 12/1981 | Moore | 405/216 |
| 4,543,764 | 10/1985 | Kozikowski | 52/514 X |
| 4,764,054 | 8/1988 | Sutton | 405/216 |
| 4,779,389 | 10/1988 | Landers | 52/169.13 |

Primary Examiner—Robert A. Dawson
Attorney, Agent, or Firm—Edgar W. Averill, Jr.

[57] ABSTRACT

A process for reinforcing and repairing utility poles and the like, including the steps of placing gasket layers above and below the area to be repaired and a resin pervious layer, such as fiberglass, between the two gaskets followed by the step of wrapping the area from the lower gasket to a point near the upper gasket with a resin impervious layer, such as duct tape. Next, a liquid resin is preferably injected under pressure into the space between the utility pole and the resin impervious layer. Holes may be drilled to guide the resin into the interior of the pole, and injection tubes may be inserted into the hole to further direct the resin into the interior of the pole. The resin is then allowed to cure. Preferably, vertical grooves are formed in the exterior of the pole, and reinforcing rods are placed therein before the resin is injected.

19 Claims, 2 Drawing Sheets

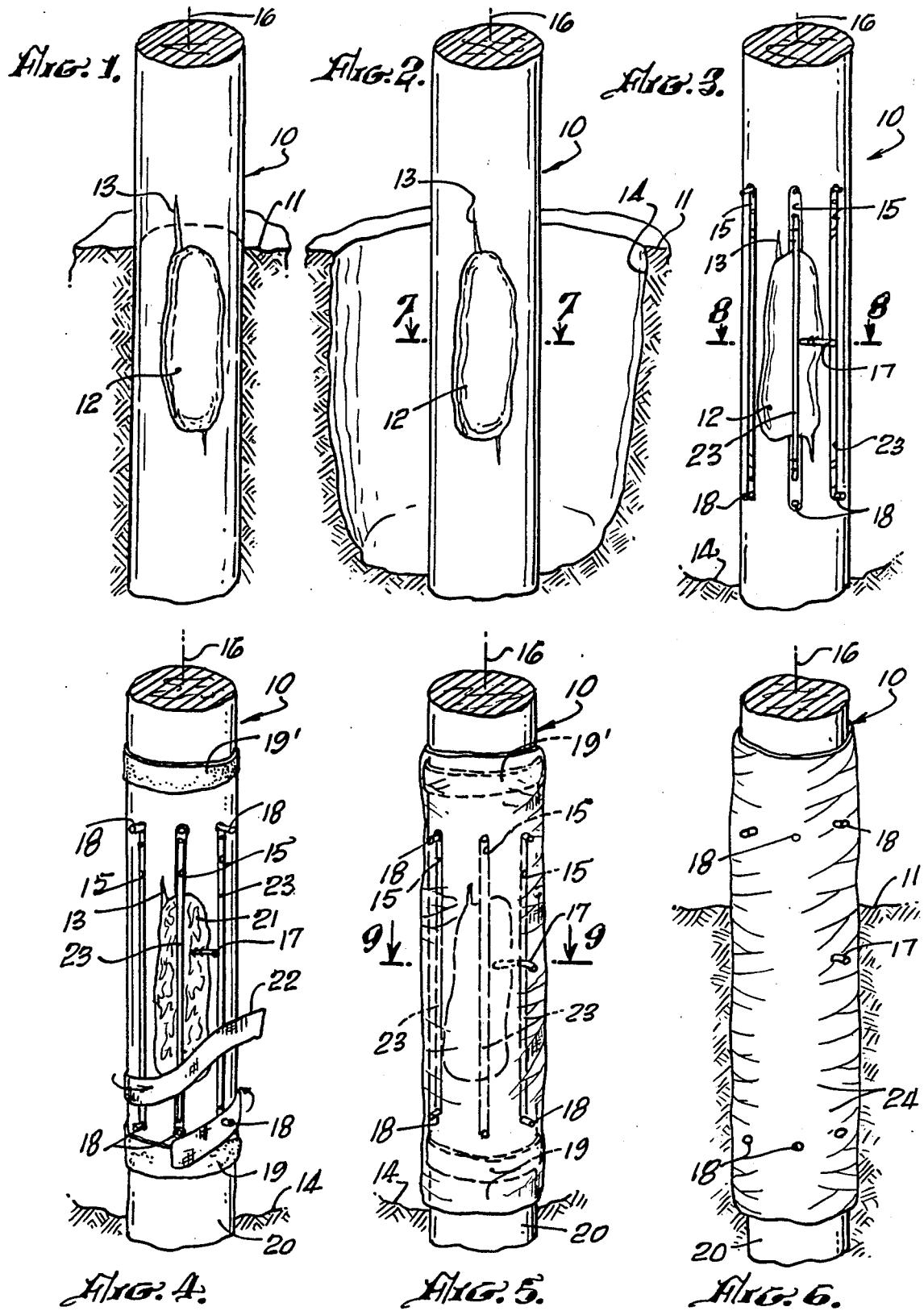

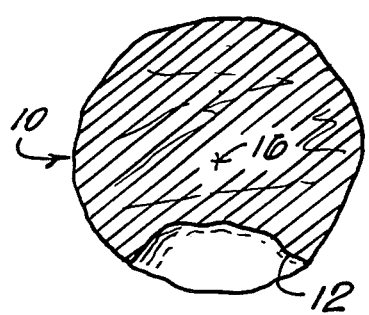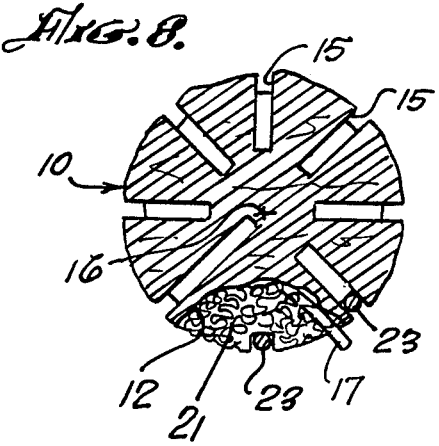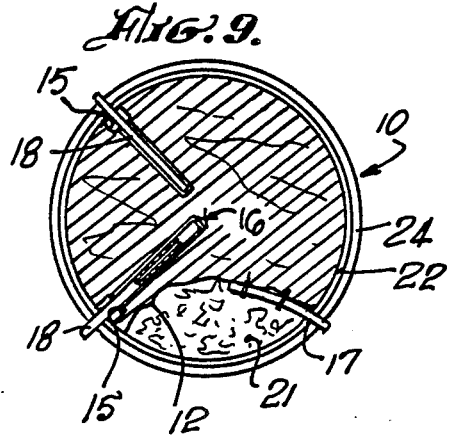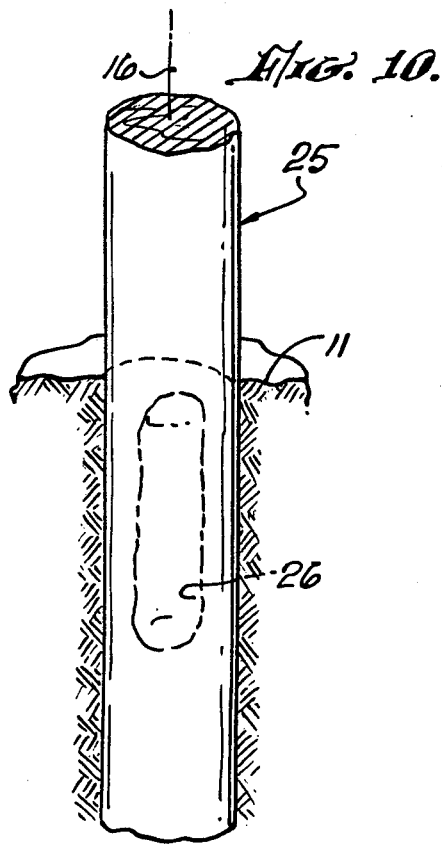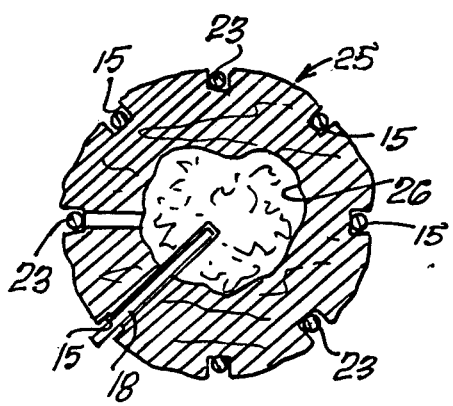

PROCESS FOR REINFORCING UTILITY POLES

BACKGROUND OF THE DISCLOSURE

The field of the invention is utility poles, and the invention relates more particularly to the repair of weakened wooden utility poles.

Although wooden utility poles are typically treated with one or more preservatives, such poles often are subjected to rot, decomposition or insect or other wild life damage during the life of the pole. Most typically, this damage is of two types. The first is an exterior area of decomposition which is typically caused by chemical or mechanical action. Perhaps more common is an area of internal rot which forms in the center of the pole usually near or slightly below the ground line and this can weaken the pole to an extent where it must be replaced.

The replacement of utility poles is especially expensive in urban areas and is especially inconvenient when it is necessary to interrupt the power or telephone service on the pole in order to replace the pole with a new one. Thus, it is highly advantageous to repair the pole without removing it, and various methods are known to carry out such repair. For instance, U.S. Pat. No. 4,779,389 discloses a metal sleeve which is filled with a foaming composition. This patent cites numerous references which also relate to the problem. Many prior art methods provide a pole which is so strongly reinforced, as with a steel sleeve, that they, in turn, can provide a safety hazard. That is, if the pole is struck by a vehicle, it is preferably that the pole shear rather than cause massive damage to the vehicle. Therefore, it is preferable that the repair system leave the pole not greatly stronger than a new utility pole.

Another disadvantage of most prior art pole repair methods is the necessity of special equipment or specially trained personnel to carry out the repair steps. It would be highly advantageous if the pole inspection crew could carry out such process.

A further disadvantage of most prior art pole repair methods is that the repaired pole has a steel collar. Such steel collar makes it impossible for the standard metal spiked lineman's boots to be used to climb the pole. Instead, line maintenance workers must use lifting equipment to get above the metal jacketed repaired area.

SUMMARY OF THE INVENTION

It is an object of the present invention to provide a utility pole repair method which can be carried out with relatively unskilled labor and which does not reinforce the pole to an extent where it provides a safety hazard.

It is a further object of the present invention to provide a utility pole repair method which will permit climbing of the repaired area with standard metal spiked lineman's boots.

The present invention is for a process for reinforcing utility poles, and the like, comprising the steps of removing any decomposed material in the area to be repaired followed by coating the periphery of the length of the pole to be repaired with a gasket material in an area below that needing reinforcing and a second ring of gasket material in the area above that requiring strengthening. Next, the area between the upper and lower rings, including any areas of external rot, is filled with a porous reinforcing material such as fiber glass, nylon cloth, burlap and the like. Next, the fiber glass covered pole is wrapped from below the lower ring to an area near the upper ring with a resin impervious layer. Next, the area between the resin impervious layer and the exterior surface of the pole in the area to be repaired is injected with a liquid, curable, injecting resin to saturate the porous reinforcing material. Lastly, the curable resin is allowed to cure. This forms a pole with a reinforced resin outer surface. The pole can be further strengthened by forming a plurality of vertical grooves in the pole in the area to be repaired and stapling, or otherwise affixing, a reinforcing rod in each of these grooves. When the resin is injected below the resin impervious layer, it also fills the grooves and the reinforcing rods which further strengthen the pole. When the area of pole damage is interior, a plurality of holes may be drilled from the exterior of the pole into the interior and, thus, resin is directed into any rotted interior area, thereby further strengthening the pole. Injection tubes can be inserted through the holes and should have an outside diameter smaller than the inside diameter of the hole. These injection tubes should extend out through the resin impervious layer and be sealed thereto. This permits resin to be injected preferably under pressure into the center of the pole and for it then to run outwardly around the injection tube and into the area between the exterior of the pole and the resin impervious layer. This provides an especially strong pole and yet not one which will provide a safety hazard. Preferably, the injecting resin is a curable epoxy resin and, preferably, the gasket layers are also formed from layers of curable epoxy resin. The repaired portion of the pole can still be climbed with the standard metal spiked lineman's boots since they will penetrate the reinforced fabric jacket to allow easy climbing.

BRIEF DESCRIPTION OF THE DRAWINGS

FIG. 1 is a perspective view, partly in cross-section showing an area of external rot in a wooden utility pole.

FIG. 2 is a perspective view analogous to FIG. 1 showing earth excavated around the area of external rot of the wooden utility pole.

FIG. 3 shows the pole of FIG. 2 including vertical grooves having reinforcing bars placed therein and injection ports drilled into the same.

FIG. 4 is a perspective view of the pole of FIG. 3 further including an adhesive layer and injection tubes inserted through the injection ports and further showing the beginning of the wrapping of the exterior of the damaged portion of the pole.

FIG. 5 is a perspective view of the pole of FIG. 4 having been completely wrapped with fiber glass and also with a layer of resin impervious tape.

FIG. 6 is a perspective view of the repaired pole.

FIG. 7 is a cross-sectional view taken along line 7—7 of FIG. 2.

FIG. 8 is a cross-sectional view taken along line 8—8 of FIG. 3.

FIG. 9 is a cross-sectional view taken along line 9—9 of FIG. 5.

FIG. 10 is a perspective view showing a utility pole having an interior rotted zone.

FIG. 11 is a cross-sectional view showing the pole of FIG. 10 at the interior rotted zone including grooves with reinforcing bars and one injection port containing an injection tube.

DESCRIPTION OF THE PREFERRED EMBODIMENTS

A utility pole in need of repair is shown in perspective view in FIG. 1 and indicated by reference character 10. Pole 10 is shown installed in the ground, and the ground level is indicated by reference character 11. An area of external rot 12 and a crack 13 are also present. Typically, the external or internal rot is near or slightly below ground level 11 and, in such cases, it is necessary to dig an evacuated area 14 out from around the base of the pole. Typically, the excavated area should be to a depth of about one and one-half feet below the bottom of any area in need of repair. Next, all decomposed or decayed material on the exterior of the pole is removed so that the resin will adhere to the sound surface of the pole. A waterblast method is particularly effective and such process will not hinder the adherence of epoxy resin materials to the exterior surface. Next, a plurality of vertical grooves 15 are formed in the exterior of the pole. These grooves should be at least three-eighths of an inch wide and at least one-half inch deep. At least one channel should be used and preferable four channels should be used, and for severely damaged poles, eight or more channels can be used. The channels should extend past the decomposed area into the solid pole surface extending a minimum of six inches below the decomposed area and a minimum of six inches above the decomposed area and equal spaces around the pole as shown in FIG. 3. Preferably, the channels should extend twelve inches or more above the decomposed area.

Next, resin injection ports are drilled or otherwise formed in the pole. The ports must be located so that the resin/hardener mixture, when injected under pressure, is free to move through cracks and into the center of the pole, as well as impregnate the entire fabricated repair volume. Injection holes having a diameter of three-eighths of an inch are believed preferred and are preferably drilled about the central axis of the pole which is indicated by reference character 16 in FIGS. 8, 9 and 11. Those skilled in utility pole inspection can usually determine the area of internal rot, and the injection ports should be placed near the bottom, middle and top of such interior decomposed area to help insure complete filling of this area. It is also advantageous to drill an injection port at the base of each groove and also at the top of each groove which allows the resin mixture to flow freely upwardly when injected through the lower port. Also, in the instance of external damage, as shown in FIGS. 1 through 9, it is beneficial to place an injection tube, such as tube 17, into the area of decomposition. The tube should be stapled in place so that it will remain in place when resin is injected therethrough. Also, as shown in FIG. 9, injection tubes 18 should be inserted in some of the injection ports so that epoxy resin may be injected into the interior of the pole under pressure through such tubes. The injection tubes should be smaller in outside diameter than the inside diameter of the injection ports. For instance, for an injection port having an inside diameter of three-eighths of an inch, an injection tube having an outside diameter of one-quarter inch would be appropriate. In this way, as the resin fills the void and begins to exit around the exterior of the injection tube, the area between the exterior of the pole and the interior of the resin impervious layer is also filled through the injection port. The injection tubes may be metal tubes such as copper or aluminum tubes and can be adhesively bonded or stapled into position. The injection tubes must be sealed with the resin impervious layer so that resin does not flow out around the injection tubes.

The next step is indicated best in FIG. 4. There, a lower ring of gasket material 19 is placed around pole 10 in a manner which fills any cracks or imperfections in the outer pole surface 20. This material may be a tacky adhesive or an epoxy resin in an uncured state. The purpose of this lower layer is to provide a resin type seal with the resin impervious layer which is to be applied later. Similarly, an upper ring 20 is applied about pole 10 as shown in FIG. 4. Next, fiber glass or other porous material having structural strength is placed in the area of external rot 12, and the layers of porous reinforcing material should have maximum strength running axially with the pole to maximize the strength of the repair. This area is indicated by reference character 21 in FIG. 4.

Next, reinforcing bars, such as those typically used in conjunction with concrete reinforcement, are placed in the vertical grooves 15. Reinforcing bars 23 are stapled or otherwise held in each of the grooves and extend essentially to the bottom, although the injection tubes 18 which are inserted at the base of each groove would be below the bottom of each reinforcing bar.

The telephone pole is next wrapped, or otherwise covered, with a layer of reinforcing material such as fiber glass, nylon cloth, burlap or the like. In the case of the use of fiber glass tape, it should be repeatedly wound until it reaches a thickness of at least one-sixteenth of an inch so that the area between the pole and the resin impervious layer will be wide enough to conduct resin. The fiber glass or other reinforcing material 22 is stapled or otherwise held to the pole and is slit or otherwise directed so that the injection tubes 18 extend through this layer. It is important that the entire area between the upper and lower rings is coated with layer 22 so that this entire area may be filled with resin. In the event fiber glass tape is used, it is preferable to wind the tape tightly up the pole from the bottom and then continue it down the pole forming a cross layer over the original layer, and this process is then repeated until the one-sixteenth inch minimum thickness is obtained. Untreated fiber glass tape having a thickness of from 10 to 20 mils and a width of up to ten inches is most desirable to form layer 22.

The exterior surface of the pole is next covered with a resin impervious layer, and various plastic sheeting can be used for this purpose. It has been found that adhesive tape of the type commonly referred to as "duct tape" is particularly easy to use and forms a layer of sufficient resin holding capability. The tape is applied starting about two inches below the bottom ring and wound upwardly in a manner that permits the injection ports to extend therethrough while still tightly sealing the injection ports to the resin impervious layer. It is preferable that the resin impervious layer 24 be discontinued slightly below the upper ring so that a vent is provided for the liquid resin to rise in the areas of the pole to be repaired.

A very low viscosity, moisture compatible, room temperature curing resin of the type which cures to a semi rigid cured polymer is, thus, suited as an injection material. Epoxy resins have been found appropriate for this purpose. Since it is preferable that the resin be cured at room temperature, in-head mixing equipment to mix the resin and the hardener together is preferred.

Alternatively, resins which cure at a higher temperature can be used, and the pole heated with electric heating or other means.

Since it is beneficial that all of the interstices of the wrapped pole be filled, the resin should not only be of low viscosity, but should also be injected under pressure, and it has been found that injection pressures of up to sixty pounds per square inch of gage pressure are useful. As the resin is extruded under pressure into one of the injection ports, some resin will begin to extrude from other ports that are near the same level. As this occurs, the ports are then plugged with corks, golf tees or other suitable methods, and the injection process is continued. The mixed resin system will rise up within the pole both in any central rotted area or in the space between the exterior of the pole and the interior of the resin impervious layer 24. This impregnates the fiber glass or other reinforcing material and will also fill the routed channels and secure the reinforcing rods in them. As the resin begins to extrude from a higher level of port, the injection head is removed from the lowest port which is then plugged and injection continues at the next highest level until all of the reinforcing material is saturated with uncured resin and hardener. The resin system is then allowed to cure, and the saturated fiber glass and metal rods are converted into a very strong protective shield which encases the entire pole. Likewise the saturated fiber glass in the decomposed area on the exterior of the pole is converted into a strong repair that acts as part of the wooden pole. All the cracks, holes, hollow cores and pores are saturated and filled with a strong adhesive which bonds the entire unit into a reinforced structure that is not only chemically resistant, but is also resistant to termites, algae and water damage.

The utility pole 25, shown in FIG. 10, has a hollow, interior rotted zone 26 which is likewise shown in cross-sectional view in FIG. 11. The repair system is identical except that no filling of an external cavity is required. The area to be repaired is excavated, grooves are routed and injection ports are drilled or otherwise formed. Injection tubes are secured in place, and the reinforcing rods are stapled or otherwise secured within the grooves. Next, the upper and lower rings are formed, and the repair area is wrapped with fiber glass or other reinforcing material leaving the injection tubes extending therefrom. Next, the area is wrapped with duct tape or other resin impervious material, and resin is injected in the lowest injection tube 18 which then both fills the interior rotted zone 26 and also flows outwardly into other injection ports into the grooves and into the area between the pole and the resin impervious layer as described above.

The result of the repair of the present invention is a very strong pole and yet a pole which is not so strong as to provide a safety hazard. The process can be carried out with relatively untrained persons and a minimum of equipment except for the resin injecting, mixing and pumping apparatus and an appropriate router and drill. The remaining tools used are typically available for persons who inspect wooden utility poles.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. A process for reinforcing utility poles and the like of the type having an area of decomposition or damage, comprising a length to be repaired comprising the steps of:
    removing any decomposed or damaged material from the exterior of the pole in the area to be repaired;
    coating the periphery of a length of the pole below the area to be repaired with an uncured but curable resin to form a lower ring;
    coating the periphery of a length of the pole above the area to be repaired with an uncured but curable resin to form an upper ring;
    covering the outer surface of the pole between the upper ring and the lower ring with a porous reinforcing material to a depth of at least one-sixteenth of an inch;
    wrapping a resin impervious layer over the porous reinforcing material at least as low as the lower ring and at least as high as near the upper ring;
    injecting a liquid, curable injecting resin below the surface of the resin impervious layer to an extent to saturate the porous reinforcing material; and
    permitting the curable resin to cure.

2. The process for reinforcing wooden utility poles of claim 1 wherein said porous reinforcing material is a fiber glass layer.

3. The process for reinforcing utility poles of claim 1 wherein said liquid, curable injecting resin is an epoxy resin.

4. The process for reinforcing utility poles of claim 1 wherein said utility pole is a wooden utility pole having a length of damage and further including the steps of:
    routing a plurality of vertical grooves along the surface to an extent of at least six inches above and below the length of damage;
    securing lengths of reinforcing rods in the vertical grooves before wrapping the resin impervious layer around the pole.

5. The process for reinforcing utility poles of claim 4 further including the step of drilling a plurality of holes toward the center of the pole in the space between the upper and lower rings.

6. The process for reinforcing utility poles of claim 5 further including the step of inserting a tubular injection tube into at least one hole, said injection tube having an outer end extending past the outer surface of the resin impervious layer so that the liquid injecting resin can be inserted into the porous reinforcing material through the injection tube.

7. The process for reinforcing utility poles of claim 6 wherein the outside diameter of the injection tube is less that the inside diameter of the hole into which it is inserted so that the injecting resin may pass in through the tube and then may flow outwardly throughout the space between the exterior of the tube and the interior of the hole and into the porous reinforcing material.

8. The process for reinforcing utility poles of claim 4 wherein said reinforcing rods are steel reinforcing rods of the type commonly used to reinforce concrete.

9. The process for reinforcing utility poles of claim 8 wherein there are at least four grooves and steel reinforcing rods.

10. The process for reinforcing utility poles of claim 1 wherein said upper and lower rings are formed from an epoxy resin.

11. The process for reinforcing utility poles of claim 1 wherein the resin impervious layer is a layer of adhesive tape.

12. A process for reinforcing wooden utility poles and the like comprising the steps of:
   clearing the periphery of the pole at any area of decomposition of any earth to expose the area of the pole to be repaired;
   removing any decayed material from the periphery of the pole to be repaired;
   forming at least four vertical grooves in the outer surface of the pole above and below the area to be repaired;
   placing steel reinforcing rods into each of the vertical grooves;
   forming a gasket about the periphery of a length of the pole below the bottom of the vertical grooves with a deformable material to form a lower ring;
   forming a gasket about the periphery of a length of the pole above the top of the vertical grooves with a deformable material to form an upper ring;
   covering the space between the upper ring and the lower ring with a layer of fiber glass to a depth of at least one-sixteenth of an inch, said fiber glass also covering the reinforcing rods;
   wrapping a resin impervious layer over the fiber glass at least as low as the lower ring and to a height at least near the upper ring to a thickness of at least one-sixteenth of an inch;
   injecting a liquid, curable injecting resin under pressure below the surface of the resin impervious layer to an extent to saturate the porous reinforcing material; and
   permitting the curable resin to cure.

13. The process for reinforcing utility poles of claim 12 further including the step of forming a plurality of holes from the exterior of the pole to any internal area of damage in the area between the upper and lower rings before the injecting step.

14. The process for reinforcing utility poles of claim 13 further including the step of inserting an injection tube into at least one of the holes and sealing the tube to the resin impervious layer, said tube having an outside dimension smaller than the inside dimension of the hole so that the injecting resin may be injected through the tube and can run outwardly through the hole and into the fiber glass between the pole and the resin impervious layer and also into the grooves so that when the injecting resin cures, the pole is surrounded with a layer of cured resin, any interior areas of rot are filled with a cured resin and the reinforcing rods are surrounded with a cured resin and bonded in their vertical grooves.

15. The process for reinforcing utility poles of claim 14 wherein there are a plurality of injection tubes at different levels between the upper and lower rings.

16. The process for reinforcing utility poles of claim 15 wherein the tubes have an outside diameter of about one-quarter of an inch, and the inside diameter of the holes is about three-eights of an inch.

17. The process for reinforcing utility poles of claim 12 wherein said gasket material is a room-temperature curable epoxy resin.

18. The process for reinforcing utility poles of claim 12 wherein said injecting resin is a room-temperature curable epoxy resin.

19. The process for reinforcing utility poles of claim 12 wherein at least one injection tube having an external end and an internal end is placed with its internal end secured in an area of external decomposition on said pole and its external end outside the resin impervious layer so that injecting resin can be injected directly into the area of external decomposition.

* * * * *